United States Patent
Gilgoff

[15] 3,669,211
[45] June 13, 1972

[54] REMOTE CONTROL AUTOMOBILE THEFT PREVENTION MECHANISM

[72] Inventor: Herman Gilgoff, 241 Beach 137th Street, Rockaway Park, N.Y. 11694

[22] Filed: April 17, 1970

[21] Appl. No.: 29,530

[52] U.S. Cl. ............................180/112, 70/255, 70/257, 70/284, 70/387, 180/114, 200/44
[51] Int. Cl. .......................................................B60r 25/04
[58] Field of Search .............180/112, 113, 114, 82; 70/237, 70/255, 256, 257, 284, 387; 200/44

[56] References Cited

UNITED STATES PATENTS

| | | | |
|---|---|---|---|
| 1,419,227 | 6/1922 | Coo | 180/114 X |
| 3,010,531 | 11/1961 | Flora | 180/114 |
| 3,502,346 | 3/1970 | Cadiou | 180/114 X |
| 3,343,625 | 9/1967 | Scheuermann | 180/114 |
| 1,549,325 | 8/1925 | Murray | 70/237 X |
| 1,968,726 | 7/1934 | Vick et al. | 70/255 |
| 2,861,644 | 11/1958 | Martin | 180/114 |
| 3,236,107 | 2/1966 | Magnusson | 74/89.17 X |
| 2,595,267 | 5/1952 | Julliard | 70/387 |

Primary Examiner—Benjamin Hersh
Assistant Examiner—John P. Silverstrim
Attorney—F. J. Pisarra

[57] ABSTRACT

A mechanism including a tamper-proof housing which is mounted on the distributor of an automobile. The housing contains a normally open electrical switch, which is series-connected to a portion of the electrical conductor which connects the automobile spark coil to the distributor and which extends through the interior of the housing, and a combination lock which is operable to actuate the switch to closed position. The lock is operated remotely from the passenger side of the automobile instrument panel through the medium of cooperating devices including a rotatable linkage, a rack and pinion assembly and a manual actuator that is conveniently accessible to the seated operator. Alternatively, a "key" may be used in place of the manual actuator. The mechanism is automatically returned to "protective condition," i.e., with the switch in open position, by a pull cable which is operated manually or by the opening of a door of the automobile, as desired.

5 Claims, 9 Drawing Figures

INVENTOR.
HERMAN GILGOFF
BY F. J. Pisarra
Attorney 3,669,211

INVENTOR.
HERMAN GILGOFF
BY
F. J. Pisarra
Attorney

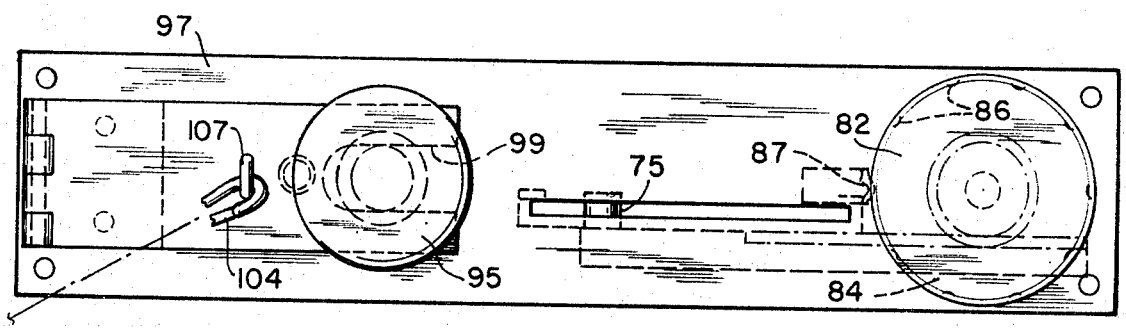
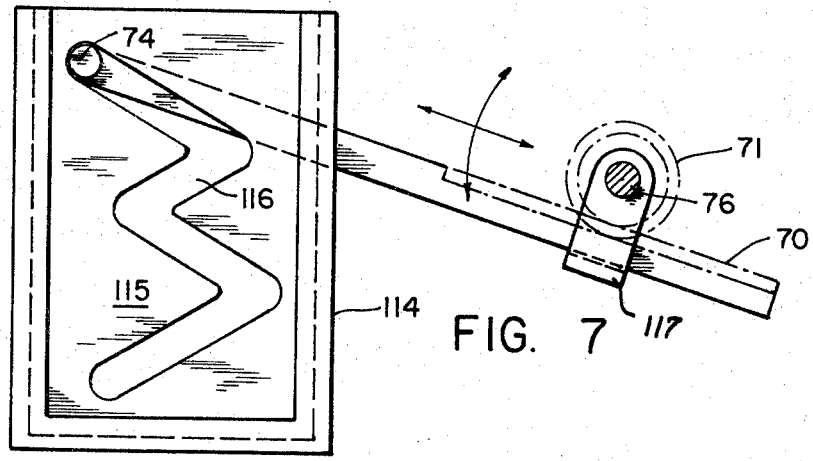
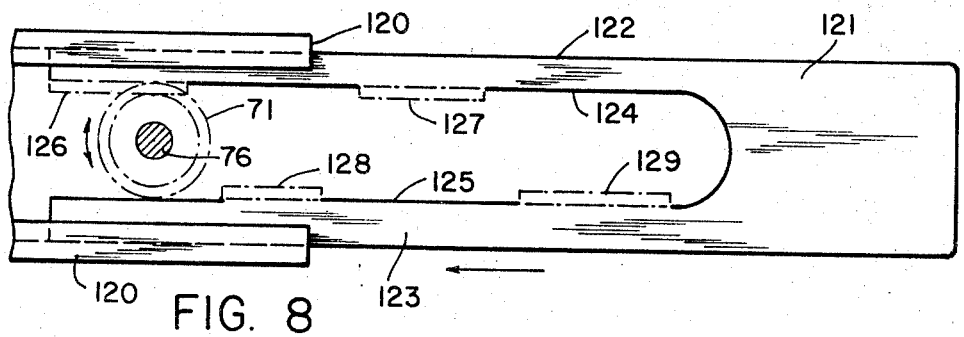
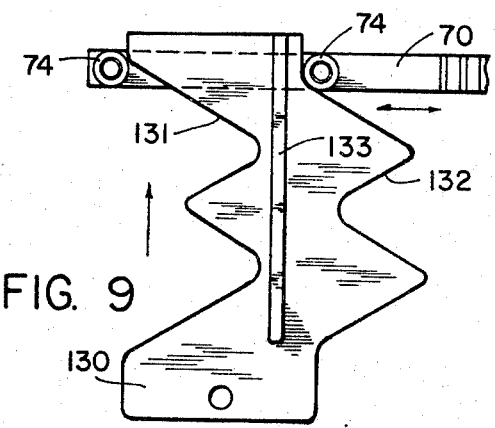
INVENTOR.
HERMAN GILGOFF
BY F. J. Pisarra
Attorney

REMOTE CONTROL AUTOMOBILE THEFT PREVENTION MECHANISM

BACKGROUND OF THE INVENTION

As is generally known, automobile theft is one of the most common crimes in this country. In fact, it has become so prevalent and widespread in recent years that the cost to owners in money, inconvenience and annoyance is inestimable. It has been ascertained that the vast majority of such thefts occur for two reasons. Firstly, careless owners frequently leave their keys in unattended automobiles, thereby making it relatively simple for the thieves. Secondly, the electrical systems that make automobile engines operative are easily "jumped," either under the hood or with harnesses which are adapted to make electrical connection with parts of the electrical system behind the instrument panel.

Insurance companies, automobile clubs and other interested groups have been engaged for some time in national publicity programs with the view of emphasizing to owners and drivers the dangers of leaving ignition keys in automobiles. The present invention will afford protection whether or not ignition keys are left in automobiles.

The problem of automobile theft is so acute that *Popular Science*, a widely read national monthly magazine, quite recently inaugurated an "anti-car theft" competition under the sponsorship of a major insurance company. As the magazine article covering the competition brings out, there have been many developments over the years with the objective of preventing automobile theft. A number of devices embodying such developments are specifically identified in the article. Additional known prior art devices include those disclosed in Vick et al. U.S. Pat. No. 1,968,726 Wilkes U.S. Pat. No. 2,439,155 and Pangborn U.S. Pat. No. 2,819,357. None of the prior art devices, so far as is known, has been accepted commercially because of various apparent and inherent ojections and disadvantages, including complex design, high manufacturing and/or installation costs, difficult to install, inconvenience of access by authorized persons and unreliability in use.

The mechanism of the present invention overcomes the objections to and disadvantages of prior art devices and affords a number of important benefits and advantages which will be readily recognized by persons trained in the art from the drawings and the detailed description appearing further along herein.

SUMMARY OF THE INVENTION

This invention relates to a mechanism that is adapted to be connected to the electrical ignition circuit of an automobile and protect the automobile against theft. The invention pertains, more particularly, to such a mechanism that is remotely and conveniently controlled by a seated driver and that has incorporated therein improved features of design and construction.

It is the primary object of this invention to provide an automobile theft-prevention mechanism having improved features of design and construction.

Another object of this invention is to provide a mechanism of the character stated that is remotely controlled by the seated driver of an automobile.

The invention has for another object the provision of a mechanism of the character stated that includes an electric switch which is series-connected to the portion of the high tension cable connecting the spark coil and the distributor of an automobile ignition circuit.

Another object of the invention is to provide a mechanism of the character stated that includes a housing containing a switch and associated devices for operating the switch, the housing being mounted on or in such near proximity to an automobile distributor cap as to prevent "jumping" of the switch or otherwise circumventing the mechanism.

A corollary to the last mentioned object is the provision of a tamper-proof housing to prevent unauthorized access to the parts contained therein.

An additional object of the invention is to provide a mechanism of the character stated that includes a combination lock which is cooperatively associated with a control switch within the indicated housing and which is operated manually or by means of a special key from a remote location.

A further object of the invention is to provide a mechanism of the character stated that is adapted to be automatically reset into locked condition, either manually or by the opening of a door of the automobile, as desired.

The invention has for a still further object the provision of a mechanism of the character stated that is simple in design; that is strong and durable in construction; that is reasonable in manufacturing and installation costs; that is adapted to be advantageously employed with new or used automobiles; and that is capable of reliably performing its intended functions over extended periods of time.

The enumerated objects and additional objects, together with the advantages of the invention, will be readily apparent to persons trained in the art from the following detailed description and the accompanying drawings which respectively describe and illustrate a preferred embodiment of the invention and several modifications.

BRIEF DESCRIPTION OF THE DRAWINGS

In the drawings, wherein like reference characters denote corresponding parts in the several views:

Fig. 6 is an elevation view taken along line 6—6 of Fig. 1;

Fig. 7 is a top plan view of a second form of key and devices actuated thereby for effecting quick operation of the mechanism;

Fig. 8 is a top plan view of a third form of key and devices actuated thereby for effecting quick operation of the mechanism; and Fig. 9 is a top plan view of a fourth form of key and devices actuated thereby for effecting quick operation of the mechanism.

Figure 1:
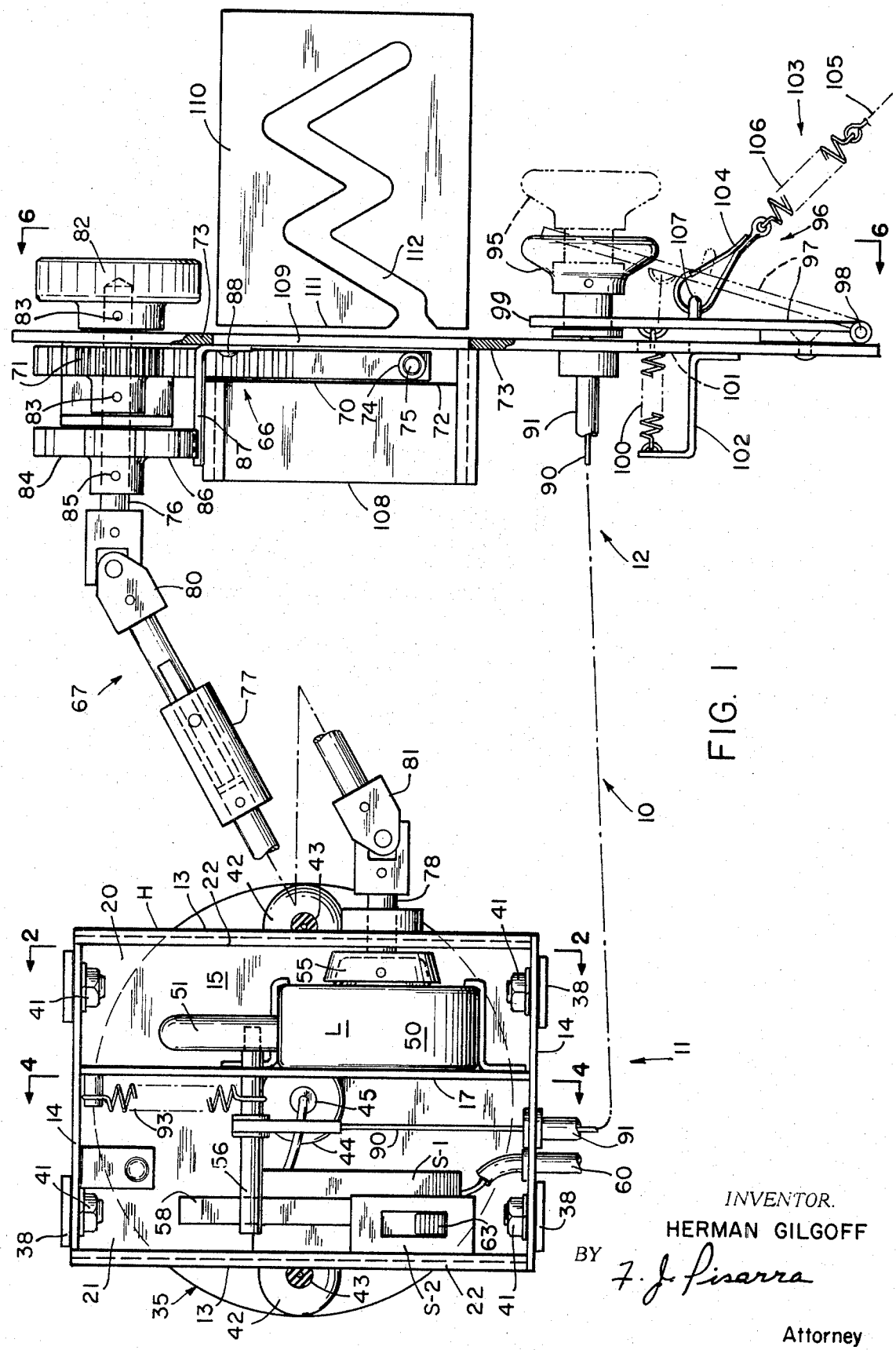
Fig. 1 is a top plan view of a mechanism constructed in accordance with this invention, certain parts being omitted and certain other parts being broken away for better illustration.

Referring initially to Fig. 1, the therein illustrated mechanism of this invention is generally identified by the numeral 10 and consists of two interconnected cooperating assemblies or means, namely, a locking means 11 and an operating means 12 for actuating the locking means.

Figure 2:
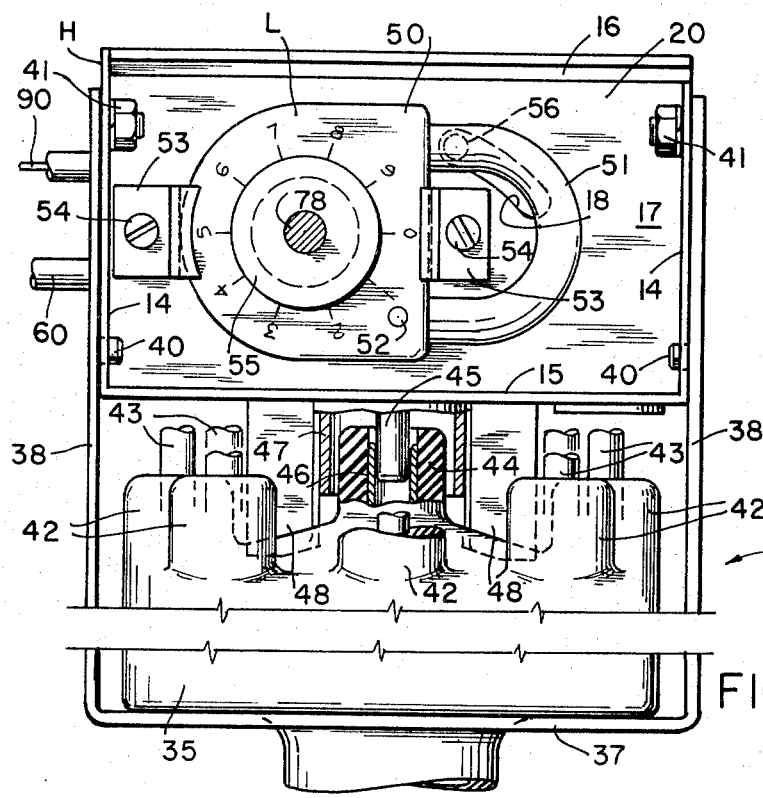
Fig. 2 is an elevation view taken along line 2—2 of Fig. 1, certain parts being shown in cross section.
Figure 4:
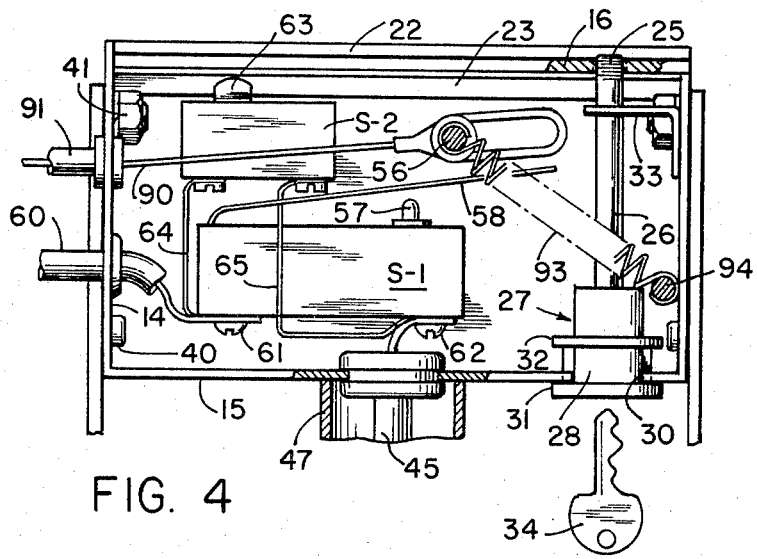
Fig. 4 is an elevation view taken along line 4—4 of Fig. 1.
Figure 5:
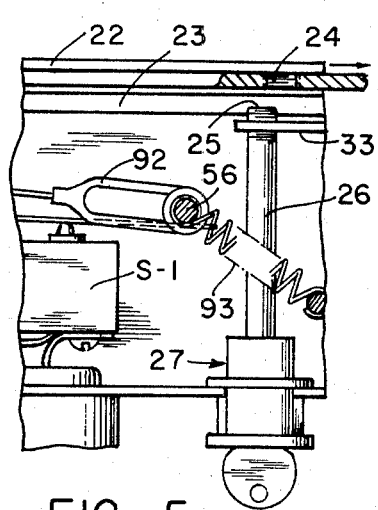
Fig. 5 corresponds to a portion of Fig. 4 and illustrates certain parts in another relative position.

Locking means 11 comprises a housing H which includes a pair of spaced parallel side walls 13, a pair of spaced parallel end walls 14, a bottom wall 15 and a removable top wall or cover 16 (Figs. 2, 4 and 5). A partition 17, having an arcuate slot 18, divides the interior of the housing into a lock compartment 20 and a switch compartment 21.

Cover 16 is removable, but is so constructed and arranged as to prevent unauthorized removal and access to the parts within the confines of the housing. To this end, housing side walls 13 are provided at their upper ends with inwardly projecting flanges 22 and carry guide angles 23 which are positioned below and parallel to the flanges. Cover 16 is slidable in the spaces between flanges 22 and angles 23 (Figs. 4 and 5). The cover has a through tap 24 for receiving the threaded free end 25 of a rod 26. A tumbler lock 27 includes a non-cylindrical casing 28 which is slidable in a non-circular opening 30 in housing bottom wall 15. Casing 28 is provided with a pair of spaced collars 31 and 32 that are positioned to opposite sides of wall 15. Rod 26 is connected to the upper end of the casing and extends through an opening (not shown) in a guide angle 33. Lock 27 is adapted to be opened by a key 34 and then turned so as to effect disengagement of rod 26 from the cover 16 to allow removal of the cover from the housing, as required.

Housing H is mounted on and secured to an automobile distributor cap 35 by a pair of U-shaped metal straps 36. Each strap consists of a web 37 which engages the underside of the distributor cap and a pair of arms 38 which bear against housing end walls 14. Arms 38 are affixed to walls 14 by connectors 40 and 41 which are inaccessible from the exterior of house H.

Distributor cap 35 may be of any suitable known construction and, in the illustrated form, includes a plurality of circumferentially spaced bosses 42 having corresponding output terminals 43. The distributor cap also includes a central boss 44 having an input terminal 45 which projects into and forms contact with a rotor contact sleeve 46 (Fig. 2). A tubular member 47 is secured, preferably by welding, to the underside of housing bottom wall 15 and protectively receives central boss 44. Member 47 is provided with lateral fins 48 that bear against corresponding bosses 42. The illustrated arrangement of straps 36, tubular member 47 and fins 48 effectively prevents removal of housing H from the distributor or rotation of the housing relative to the distributor.

A combination lock L is located in compartment 20 and includes a casing 50 and a spring loaded shackle 51 which is pivotally connected to the casing by a pin 52. Lock L may be of any suitable commercial type. A preferred combination lock of this type is presently available under the trademark "Gougler," manufactured by C. L. Gougler Machine Co., Kent, Ohio. The lock casing is attached to housing partition 17 by a pair of clips 53 and corresponding screws 54. The lock also includes a rotor 55 for actuating it to release condition. Attached to shackle 51 is a pin 56 which extends through slot 18.

Lock L is preferably four-positioned in construction, i.e., it is preset to open when rotor 55 is turned sequentially to each of four predetermined positions. Such positions may, for example, be "left 7," "right 4," "left 6" and "right 7."

Positioned within compartment 21 is a normally open electrical switch S-1 which is best shown in Fig. 4. This switch includes a spring-pressed button 57 for closing the switch and a resilient arm 58 that normally extends over and above push button 57 and beneath lock pin 56. The high tension conductor 60 of the automobile spark coil (not shown) extends through a housing end wall 14. Switch S-1 is series-connected to conductor 60 and distributor terminal 45 by respective screw connectors 61 and 62.

Also positioned within compartment 21 is a second normally open electrical switch S-2 having a slide type actuator 63. Switch S-2 is likewise series-connected to conductor 60 and terminal 45 by respective leads 64 and 65.

Figure 3:
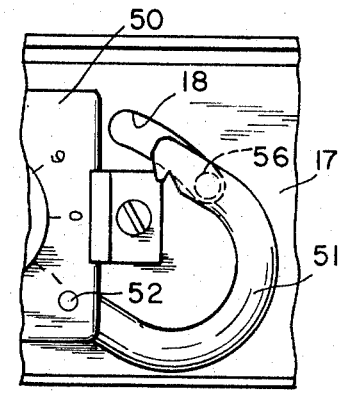
Fig. 3 corresponds to a portion of Fig. 2 and illustrates parts of the lock in another relative position.

It will be observed from an examination of Figs. 1, 2 and 4 that, when the parts are in the relative position shown therein, combination lock L is in closed condition and switch S-1 is in its normal open position, thereby interrupting the circuit to the distributor and preventing starting of the automobile engine. As will be described further along herein, lock L is operable by operating means 12 to allow its shackle 51 to swing about pivot pin 52 from closed position, as shown in FIG. 2, to open position, as shown in Fig. 3. This causes pin 56 to engage and flex resilient arm 58 downwardly from the position shown in Fig. 4 to that shown in Fig. 5. As a result, arm 58 engages and depresses push button 57, thereby closing switch S-1 and allowing the automobile engine to be started and operated in its normal manner. The parts remain in the relative position shown in Figs. 3 and 5 until such time as shackle 51 is returned to lock position (Fig. 2), thereby allowing switch S-1 to return to open position (Fig. 4), as will also be described further along herein.

Operating means 12 for actuating locking means 11 will now be described, having reference initially to Fig. 1. Means 12 includes a gear assembly 66 and a linkage 67 which is connected to the gear assembly and to rotor 55 of combination lock L.

Gear assembly 66 comprises a rack 70 and a pinion 71 which meshes with the rack. Rack 70 is supported by and slidable along a horizontal track 72 which is attached to automobile instrument panel 73 and which is located between the instrument panel and housing H. A roller 74 is rotatable about a vertical pin 75 that is affixed to one end portion of rack 70.

Linkage 67 comprises a first rotary shaft 76 that extends through and is supported by instrument panel 73; a splined telescopic rod 77; a second rotary shaft 78 that extends through a housing side wall 13 and is connected to rotor 55 a combination lock L; a first universal coupling 80 connecting shaft 76 to one end of rod 77 and a second universal coupling 81 connecting shaft 78 to the other end of rod 77. A knob or hand wheel 82 is secured to shaft 76 by a set screw 83 and is positioned to the side of instrument panel 73 facing the driver of the automobile. A disc 84 is secured to shaft 76 by a set screw 85 and is positioned between pinion 71 and universal coupling 80. The disc is provided with circumferentially spaced peripheral notches 86. The spacing of notches 86 corresponds to the increments through which rotor 55 of combination lock L must be turned in selected directions in actuating the lock from locked condition (Fig. 2) to unlocked condition (Fig. 3). An angle member having a flexible arm 87 is secured to instrument panel 73 by a rivet or the like 88. Arm 87 presses against the periphery of disc 84 and moves notches 86 in response to turning a shaft 76 and disc 84. Disc 84 and arm 87 are in the nature of a "clicker" which audibly signals successive increments of rotation of shaft 76 in either direction, in the course of turning knob 82, as required by the built-in combination of lock L, to place it in unlocked condition.

Combination lock L is adapted to be readily reset from unlocked condition (Fig. 3) to locked condition (Fig. 2) and thereby automatically reset switch S-1 to its normal open position (Fig. 4) by a flexible cable 90 which is slidable in a flexible sheath 91. One end of cable 90 is coupled to lock pin 56 by a slotted connector 92 (Figs. 4 and 5). A helical spring 93 is connected at one end to pin 56 and at its other end to a pin type post 94 which is secured to the housing. The other end of cable 90 extends through panel 73 and is secured to a pull knob 95 (Fig. 1) that is located adjacent the driver's side of the instrument panel.

Combination lock L is also adapted to be automatically reset from unlocked condition to locked condition through the medium of a means 96 which is cooperatively associated with cable 90 and pull knob 95, as best shown in Fig. 1. Means 96 comprises a hinge plate 97 that is pivotal relative to instrument panel 73 by a hinge pin 98. Plate 97 is bifurcated at its free end as indicated at 99 in Fig. 1 for accommodation of cable 90. A helical spring 100 extends through an opening 101 in instrument panel 73 and its connected at one end to hinge plate 97 and at its other end to an arm of a Z-bracket 102 which is affixed to the inside of the instrument panel. Spring 100 biases hinge plate 97 in a counter-clockwise direction about hinge pin 98 and yieldingly maintains the hinge plate and associated parts in the relative position shown in Fig. 1.

Means 96 also comprises a flexible and extensible coupler 103 which consists of a snap hook 104, a cable 105 and a helical spring 106 intermediate the snap hook and the cable. The snap hook releasably engages an eye element 107 which is affixed to hinge plate 97 while cable 105 is connected to a door of the automobile (not shown).

When the automobile door is opened, coupler 103 swings hinge plate 97 in a clockwise direction from the full line position shown in Fig. 1 to the broken line position against the action of spring 100. Pull knob 95 is simultaneously moved by hinge plate 97 from its full line position to its broken line position, thereby correspondingly moving cable 90 toward the right (Fig. 1) and actuating the locking means to locked condition. When the door is closed, spring 100 automatically returns hinge plate 97 to its normal, full line position. Snap hook 104 permits ready detachment of coupler 103 from the hinge plate, as desired.

Instead of operating knob 82 to place lock L in unlocked condition, the same result may be obtained by the use of a key arrangement, as will now be described having reference to Fig. 1. This arrangement includes a guide member 108 secured to instrument panel 73 adjacent and parallel to rack 70. Guide member 108 is aligned with a slot 109 in the instrument panel. A flat plate-type key 110, having a leading edge 111, is provided with a camming slot 112 which extends inwardly from edge 111. Slot 112 is contoured so as to define successive portions corresponding in length to the preset positions of the lock.

Key 110 is adapted to be moved to the left, as viewed in Fig. 1, through slot 109 and into engagement with guide member 108. Continued movement of the key to the left causes roller 74 to be received in the left end of slot 112. The key and the associated parts of the mechanism are so arranged as to effect movements of rack 70, pinion 71 and linkage 67 whereby to automatically operate and release the lock.

Figs. 7, 8 and 9 are modifications of this invention and respectively illustrate three other key arrangements and parts of corresponding gear assemblies that may be used in place of the above described key arrangement and associated parts to effect unlocking of combination lock L.

The modification of the invention shown in Fig. 7 includes a stationary frame 114 for receiving and holding a flat key 115. A slot 116, which corresponds to slot 112 of key 110, is wholly within the confines of key 115. In this instance, rack 70 is supported by and slidable along a U-shaped guide 117 which is pivotal about the axis of shaft 76. Roller 74 is received at one end of slot 116 and is moved along the path defined by the slot to thereby correspondingly move rack 70 and rotate pinion 71 to convert combination lock L to unlocked condition.

Referring next to Fig. 8, the therein illustrated modification includes a pair of spaced, parallel, stationary guides for receiving a U-shaped key 121 having an upper arm 122 and a lower arm 123. These arms have respective parallel inner edges 124 and 125. Secured to edge 124 is a pair of spaced upper rack sections 126 and 127. A similar pair of rack sections 128 and 129 are secured to edge 125. The rack sections are arranged for successive meshing with pinion 71 as the key 121 is moved toward the left, as viewed in Fig. 8, to effect unlocking of combination lock L.

The modification of the invention shown in Fig. 9 includes a flat key 130 having camming side edges 131 and 132. Key 130 is formed with a slot 133 for reception of a stationary guide element (not shown). The rack 70 is provided with a pair of spaced earlier-described rollers 74. Each camming edge 131 and 132 engages a corresponding roller 74. As will be apparent from an examination of Fig. 9, the key camming edges 131 and 132 cooperate with rollers 74 to actuate rack 70 and other parts to effect unlocking of combination lock L.

Based on the foregoing, it is believed that the construction, operation, objects and advantages of my present invention will be readily comprehended by persons skilled in the art, without further description. It is to be clearly understood, however, that various changes in the constructions described above and illustrated in the drawings may be made without departing from the scope of the invention, it being intended that all matter contained in the description or shown in the drawings shall be interpreted as illustrative only and not in a limiting sense.

I claim:

1. In a mechanism for use with an automobile electrical ignition circuit which includes a spark coil, a distributor and a conductor leading from the spark coil to the distributor, locking means and operating means for actuating the locking means; said locking means comprising a housing adapted to be mounted in close proximity to the distributor, said housing including a bottom wall, a pair of upstanding spaced side walls, a pair of upstanding spaced end walls, a removable top wall, a partition between and spaced from the housing side walls and dividing the interior of the housing into a first compartment and a second compartment, a locking device detachably connecting the bottom wall to the top wall, said locking device being positioned in the housing and operable from beneath the bottom wall to prevent unauthorized removal of the top wall, attaching means secured to one of said pair of walls and adapted to couple the housing to the automobile distributor cap, a combination lock positioned within the first compartment and including a casing, a shackle carried by the casing and a pivot connecting the shackle to the casing, said shackle being movable in opposite directions about the axis of the pivot relative to the casing whereby to alternately place the lock into and out of locked condition, a normally open first electrical switch positioned within the second compartment and connected to the conductor and the distributor, switch-actuating means responsive to movement of the shackle from locked condition to unlocked condition to close the first switch, said operating means comprising a gear assembly, a rotary linkage connected to the gear assembly and to the lock, means for actuating the linkage and the gear assembly from a location that is remote from the locking means, and a normally open second electrical switch within the second compartment and connected to the conductor and the distributor, said second switch being adapted to be operated manually in the event of an emergency to by-pass the first switch.

2. A mechanism according to claim 1 wherein the partition is provided with a slot and wherein the switch-actuating means comprises a pin secured to the shackle and projecting through the slot.

3. In a mechanism for use with an automobile electrical ignition circuit which includes a spark coil, a distributor and a conductor leading from the spark coil to the distributor, locking means and operating means for actuating the locking means; said locking means comprising a housing adapted to be mounted in close proximity to the distributor, a combination lock positioned within the housing and including a casing and a shackle carried by the casing and movable in opposite directions relative to the casing whereby to alternately place the lock into and out of locked condition, a normally open electrical switch positioned within the housing and connected to the conductor and the distributor, and switch-actuating means responsive to movement of the shackle from locked condition to unlocked condition to close the switch, said operating means comprising a gear assembly, a rotary linkage connected to the gear assembly and to the lock, said linkage comprising a first rotary shaft adapted to be mounted on a support forming part of the automobile, such as an instrument panel, a second rotary shaft projecting into the housing and connected to the lock release devices, a rod intermediate the first and second shafts, means for varying the effective length of the rod, a first universal coupling connecting one end of the rod to the first shaft and a second universal coupling connecting the other end of the rod to the second shaft, said gear assembly comprising a pinion carried by and rotatable with the first rotary shaft and a rack meshing with the pinion and adapted to be mounted on and move along the support, said means for actuating the linkage and the gear assembly comprising a knob secured to the first rotary shaft and operable from the side of the instrument panel which is remote from the housing, and a key engageable with the rack for moving the same in a manner to operate the pinion and linkage and place the lock into unlocked condition.

4. In a mechanism for use with an automobile electrical ignition circuit which includes a spark coil, a distributor and a conductor leading from the spark coil to the distributor, locking means and operating means for actuating the locking means; said locking means comprising a housing adapted to be mounted in close proximity to the distributor, a combination lock positioned within the housing and including a casing and a shackle carried by the casing and movable in opposite directions relative to the casing whereby to alternately place the lock into and out of locked condition, a normally open electrical switch positioned within the housing and connected to the conductor and the distributor, and switch-actuating means responsive to movement of the shackle from locked condition to unlocked condition to close the switch, said operating means comprising a gear assembly, a rotary linkage connected to the gear assembly and to the lock, said linkage comprising a first rotary shaft adapted to be mounted on a support forming part of the automobile, such as an instrument panel, a second rotary shaft projecting into the housing and connected to the lock release devices, a rod intermediate the first and second shafts, means for varying the effective length of the rod, a first universal coupling connecting one end of the rod to the first shaft and a second universal coupling connecting the other end of the rod to the second shaft, said gear assembly comprising a pinion carried by and rotatable with the first rotary shaft and a rack meshing with the pinion and adapted to be mounted on and move along the support, said means for actuating the linkage and the gear assembly comprising means for resetting the lock from unlocked to locked condition, said last-mentioned means comprising a flexible cable which is coupled at one end to the switch-actuating means and at its other end to a pull member which is located to the side of the instrument panel that is remote from the housing.

5. A mechanism according to claim 4 further including a flexible coupler which is detachably connected to the cable and which is adapted to be connected to and actuated by a door of the automobile.

* * * * *